(12) United States Patent
Bateman

(10) Patent No.: US 7,168,527 B2
(45) Date of Patent: Jan. 30, 2007

(54) ADJUSTABLE WHEEL TORQUE ASSISTING DEVICE WITH ANTI-SLIP TEETH

(75) Inventor: Garrett W. Bateman, P.O. Box 21433, Keizer, OR (US) 97307

(73) Assignee: Garrett W. Bateman, Salem, OR (US)

( * ) Notice: Subject to any disclaimer, the term of this patent is extended or adjusted under 35 U.S.C. 154(b) by 0 days.

(21) Appl. No.: 10/633,466

(22) Filed: Aug. 1, 2003

(65) Prior Publication Data

US 2004/0040794 A1   Mar. 4, 2004

Related U.S. Application Data

(60) Provisional application No. 60/401,045, filed on Aug. 5, 2002.

(51) Int. Cl.
*B60T 3/00* (2006.01)
(52) U.S. Cl. .................................................. 188/32
(58) Field of Classification Search ............ 188/32; D12/217
See application file for complete search history.

(56) References Cited

U.S. PATENT DOCUMENTS

| | | | |
|---|---|---|---|
| 1,188,745 A | 6/1916 | Evans | |
| 1,967,823 A * | 7/1934 | Houston | 188/32 |
| 2,299,115 A | 10/1942 | Staley | |
| 2,496,499 A | 2/1950 | Slavico | |
| 2,630,192 A | 3/1953 | Stenhouse | |
| 2,862,579 A * | 12/1958 | Jicha et al. | 188/32 |
| 3,065,827 A * | 11/1962 | Timbers | D12/217 |
| 3,289,794 A * | 12/1966 | Miles | 188/32 |
| 3,357,639 A * | 12/1967 | Peterson | 188/32 |
| 3,387,686 A * | 6/1968 | Little | 188/32 |
| 3,512,613 A * | 5/1970 | Peterson | 188/32 |
| 3,557,909 A | 1/1971 | Neumann | |
| 3,661,229 A | 5/1972 | Stonhaus | |
| 3,664,466 A * | 5/1972 | Rotheiser | 188/32 |
| 3,819,138 A * | 6/1974 | Rehkopf et al. | 188/32 |
| 3,845,845 A | 11/1974 | Geisthoff | |
| 4,034,961 A * | 7/1977 | Breen | 188/32 |
| 4,140,206 A | 2/1979 | Yamazaki | |
| 4,421,210 A | 12/1983 | Sugino | |
| 4,842,460 A * | 6/1989 | Schlesch | 188/32 |
| 4,867,278 A | 9/1989 | Walton | |
| 5,444,949 A * | 8/1995 | Ciaccio | 188/32 |
| 5,465,814 A | 11/1995 | Ziaylek | |
| 6,260,666 B1 * | 7/2001 | Freeman | 188/32 |
| 6,390,245 B1 | 5/2002 | Metz | |

* cited by examiner

*Primary Examiner*—Robert A. Siconolfi
(74) *Attorney, Agent, or Firm*—Schwabe Williamson & Wyatt

(57) ABSTRACT

A wheel torquing assisting device for allowing lateral movement of a suspended vehicle wheel while preventing rotation of the suspended vehicle wheel, including anti-slip teeth on the wheel-engaging face, a forefoot portal and means for varying the height and/or width of the device.

16 Claims, 15 Drawing Sheets

ADJUSTABLE WHEEL TORQUE ASSISTING DEVICE WITH ANTI-SLIP TEETH

CROSS REFERENCE TO RELATED APPLICATION

U.S. Provisional Application No. 60/401,045 filed Aug. 5, 2002, which is incorporated herein by reference as if set forth verbatim.

FEDERALLY SPONSORED RESEARCH AND DEVELOPMENT

Not applicable

MICROFICHE APPENDIX

Not applicable

BACKGROUND OF THE INVENTION (1) Field of the Invention

The present invention generally relates to devices or tools adapted to be wedged between a vehicle and the ground, to prevent the rotation of the adjacent vehicle wheel around its axle. More particularly, the present device/tool is used when the vehicle is lifted off the ground, so that its tire is suspended above the ground. In particular, although the tool described herein prevents rotation of the adjacent wheel around its axle, the wheel is allowed to move perpendicularly to its axle so that the wheel can fully seat against the hub assembly of the vehicle while torque is being applied to the lug nuts of the wheel.

(2) Description of Related Art Including Information Disclosed 37 CFR 1.97 and 1.98.

Known in the art are various wheel chocking devices. These devices invariably prevent the vehicle from rolling. Moreover, the known devices usually cannot be used on tires of variable width, nor are they intended to be used in conjunction with the user's foot.

The following patents are arguably related to the patentability of the subject invention:

| U.S. Pat. No. | 1st Inventor | Date |
|---|---|---|
| 6,390,245 | Metz | May 21, 2002 |
| 5,465,814 | Ziaylek | Nov. 14, 1995 |
| 4,867,278 | Walton | Sep. 19, 1989 |
| 4,421,210 | Sugino | Dec. 20, 1983 |
| 4,140,206 | Yamazaki | Feb. 20, 1979 |
| 3,845,845 | Geisthoff | Nov. 5, 1974 |
| 3,664,466 | Rotheiser | May 23, 1972 |
| 3,661,229 | Stonhaus | May 9, 1972 |
| 3,557,909 | Neumann | Mar. 27, 1969 |
| 3,289,794 | Miles | Dec. 6, 1966 |
| 2,630,192 | Stenhouse | Dec. 21, 1950 |
| 2,496,499 | Slavico | Feb. 7, 1950 |
| 2,299,115 | Staley | Oct. 20, 1942 |
| 1,188,745 | Evans | Jun. 27, 1916 |

U.S. Pat. No. 5,465,814 issued to Ziaylek discloses downstanding teeth to facilitate engagement of the wheel chock with the ground. The wheel-engaging face is smooth.

U.S. Pat. No. 3,664,466 issued to Rotheiser discloses a wheel wedge having a flat wheel-engaging face with periodic ridges across it.

U.S. Pat. No. 3,289,794 issued to Miles discloses a wheel chock having a concave and smooth wheel-engaging face with a plurality of openings therein.

U.S. Pat. No. 1,188,745 issued to Evans discloses a chock block in which the wheel-receiving face includes an arcuate and concave trough or groove, for accepting the tire.

BRIEF SUMMARY OF THE INVENTION

In most general terms, the invention disclosed herein comprises (includes) a device for preventing rotation of a suspended vehicle wheel, including a plurality of parallel upstanding margins each comprising an uppermost edge ascending concavely and defining a tire engaging interface; each of said uppermost edges further includes scalloping defining a plurality of sawteeth each having an apex comprising said tire or tread engaging interface.

The invention disclosed herein, commonly called the "Torque Buddy", is an automotive tire tool that is designed to facilitate tightening and loosening wheel lug nuts while a vehicle is elevated and the tires are suspended above the ground. A vehicle wheel (with its associated tire) is held in its mounted position on a vehicle hub assembly by a series of lug nuts evenly spaced axially in a circle near the center of the wheel. The proper mounting or attachment of a wheel/tire to the vehicle hub assembly ideally includes obtaining the proper seating or contact between the wheel/tire and the vehicle hub assembly, especially at the points of attachment of the lug nuts; this includes maintaining the proper alignment and relative pressure of the wheel against the hub assembly, until all points of attachment of lug nuts are properly seated and pressure is applied essentially equally to all points of attachment of lug nuts. After such equal pressure is attained and each respective lug nut is tightened to maintain such equal pressure and seating, it is also advantageous to fully tighten all lug nuts the proper torque amount, to assure continued maintenance of the equal pressure and seating. The process of properly mounting a wheel is often called torqueing.

The purpose of the tool is to allow the loosened wheel to move perpendicular to its axle, but not rotate around its axle, so that the tire and wheel can fully seat against the hub assembly of the vehicle while torque is being applied to tighten the lug nuts. The tire and wheel is able to fully seat against the hub because there is no load from the weight of the vehicle preventing the tire and wheel from doing so. The Torque Buddy is also designed for assisting in the loosening of stubborn lug nuts, by gripping the tire so that appropriate pressure may be applied to the lug nuts to break them free.

The gripping surface of the Torque Buddy has a plurality of spaced sawteeth, preferably about six such teeth, specifically designed to grip the tire tread while the vehicle is elevated and the tire is suspended the air. The Torque Buddy is equipped with a cut out or recessed area for the user to place his or her foot, to hold the tool steady while in use. As the tire tries to rotate from the application of twisting or torque on the lug nuts, the Torque Buddy grips the tire tread and creates a wedge against the ground so that the tire cannot rotate on its axle but can still move sufficiently from side to side. The Torque Buddy is preferably built fully or partly out of steel, aluminum or plastic, although any suitable materials may be used so long as the materials provide the structural support and other features necessary.

Moving the device into engaging contact with the tire may initially occur by positioning the device so that the leading tip approaches the suspended or elevated tire (in the direction opposing tire rotation) at the essentially perpendicular angle formed by the essentially horizontal tire tread and the essentially vertical tire sidewall (crown); the movement may occur by sliding and/or slightly rocking the device, leading tip first, toward the suspended tire at said angle until engaging contact is made. The rows of teeth may be positioned so that they essentially straddle that angle, with at least one tooth of the array up one upstanding margin contacting the outer crown of the tire and with at least one tooth of the array up the other upstanding margin contacting the tire tread. The tire may thereby be slightly captured between two rows or arrays of teeth. The device may then be moved into further engaging contact with the tire, by hand or by using the forefoot inserted into one of the portals or recesses in the device described herein. This may enable to device to further capture or grip the tire. During this process, the user may also move (or slightly rock) the suspended tire laterally (sideways, back and forth), with the engaged device allowing and accommodating such slight lateral movement, to enable the wheel (movably impaled on the lug bolts) to fully seat against the vehicle hub before the lug nuts are fully tightened and optimally torqued to secure the wheel/tire to the vehicle.

One primary object of the present invention is to provide a device that is satisfactorily prevents rotation of a tire around its axle when the tire is suspended above the ground.

Yet another object of the invention is to provide a device that is adjustable as to height and/or width.

Another primary object of the present invention is to provide a device that is strong and durable.

Another object of the invention is to provide a device that is easy and economical to manufacture and to use.

Other objects will be apparent from a reading of the written description disclosed herein, together with the claims.

Figure 1:
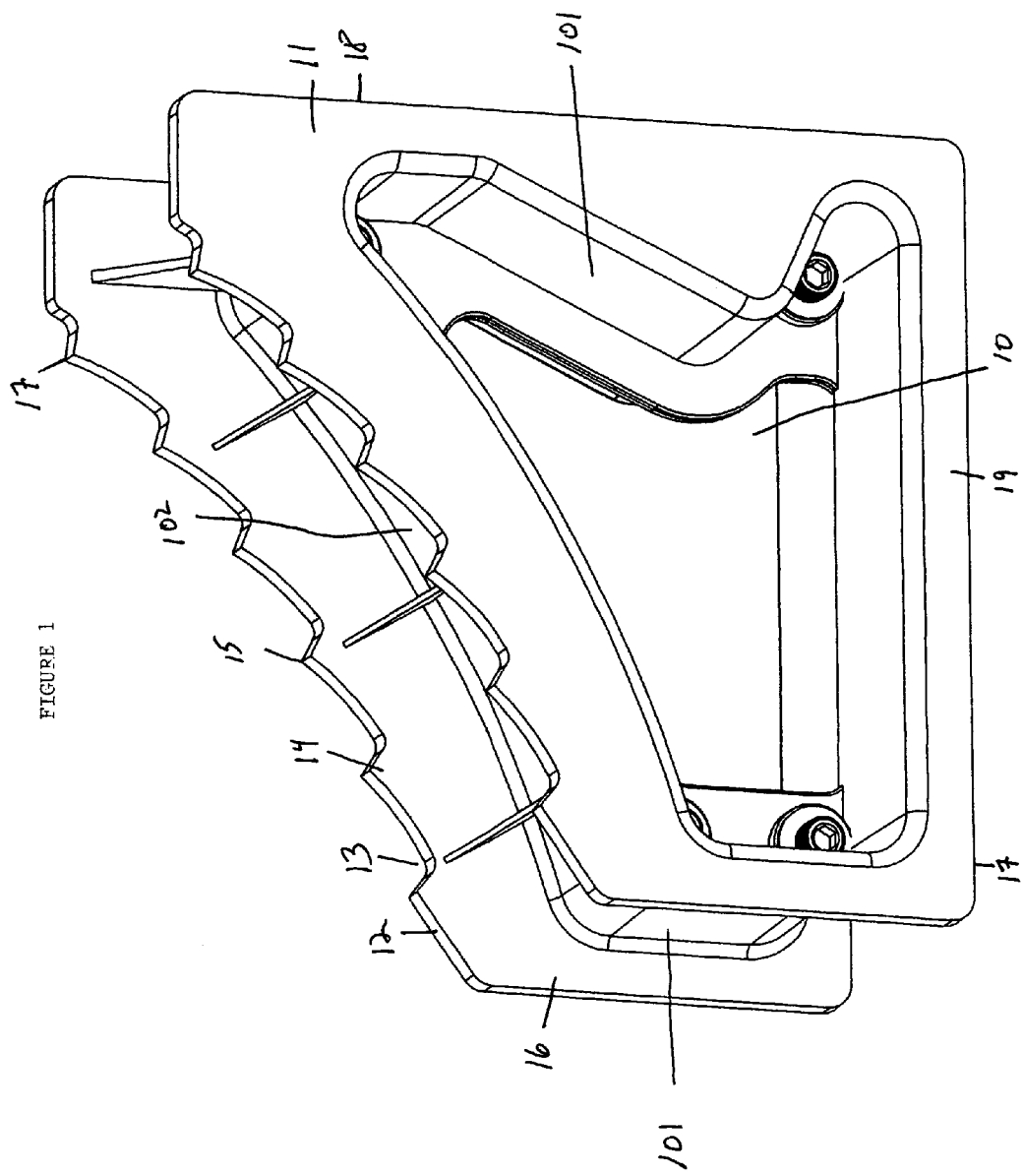
FIG. 1 depicts a perspective view from the side and front of one version of the invention including two complimentary halves joined along a longitudinal plane extending from the leading tip to the trailing end.
Figure 2:
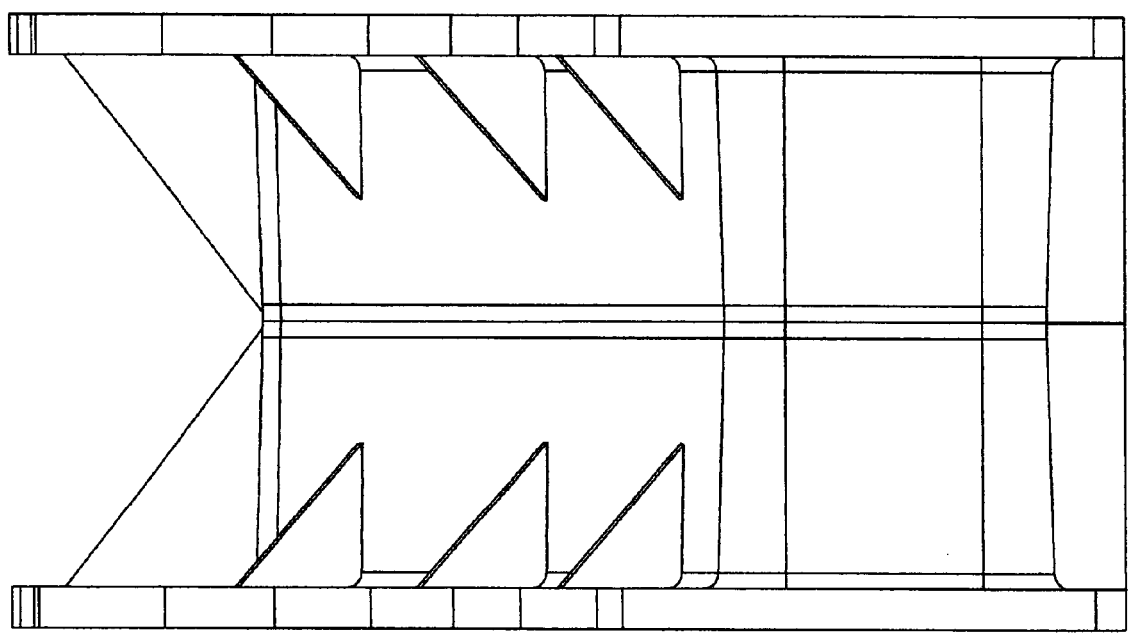
FIG. 2 depicts a front elevational view of the invention of FIG. 1.
Figure 3:
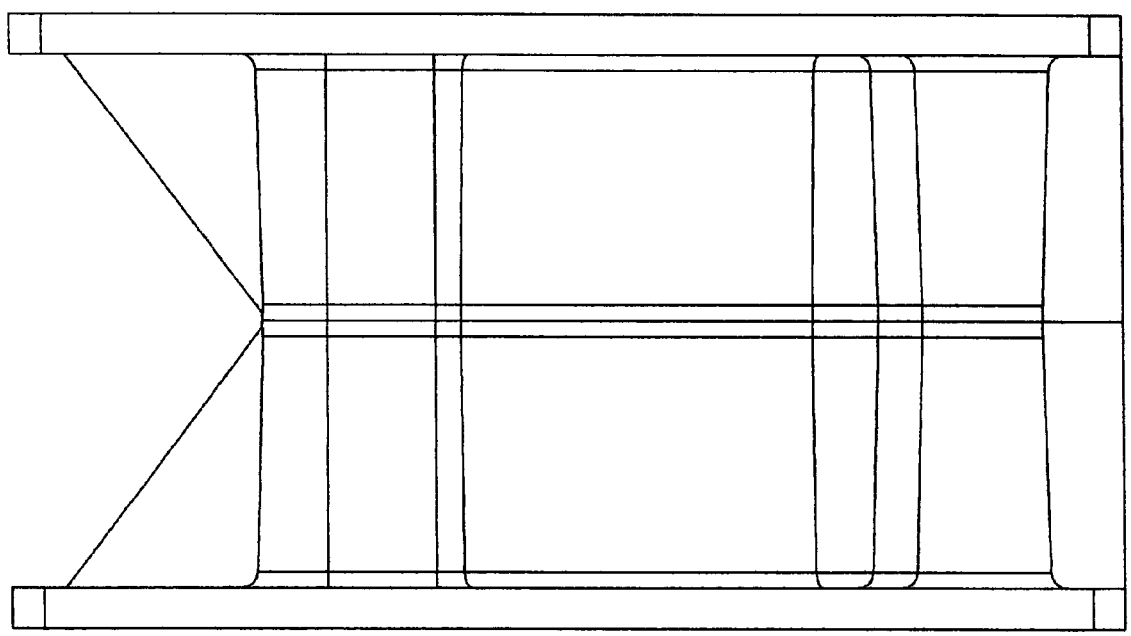
FIG. 3 depicts a back elevational view of the invention of FIG. 1.
Figure 4:
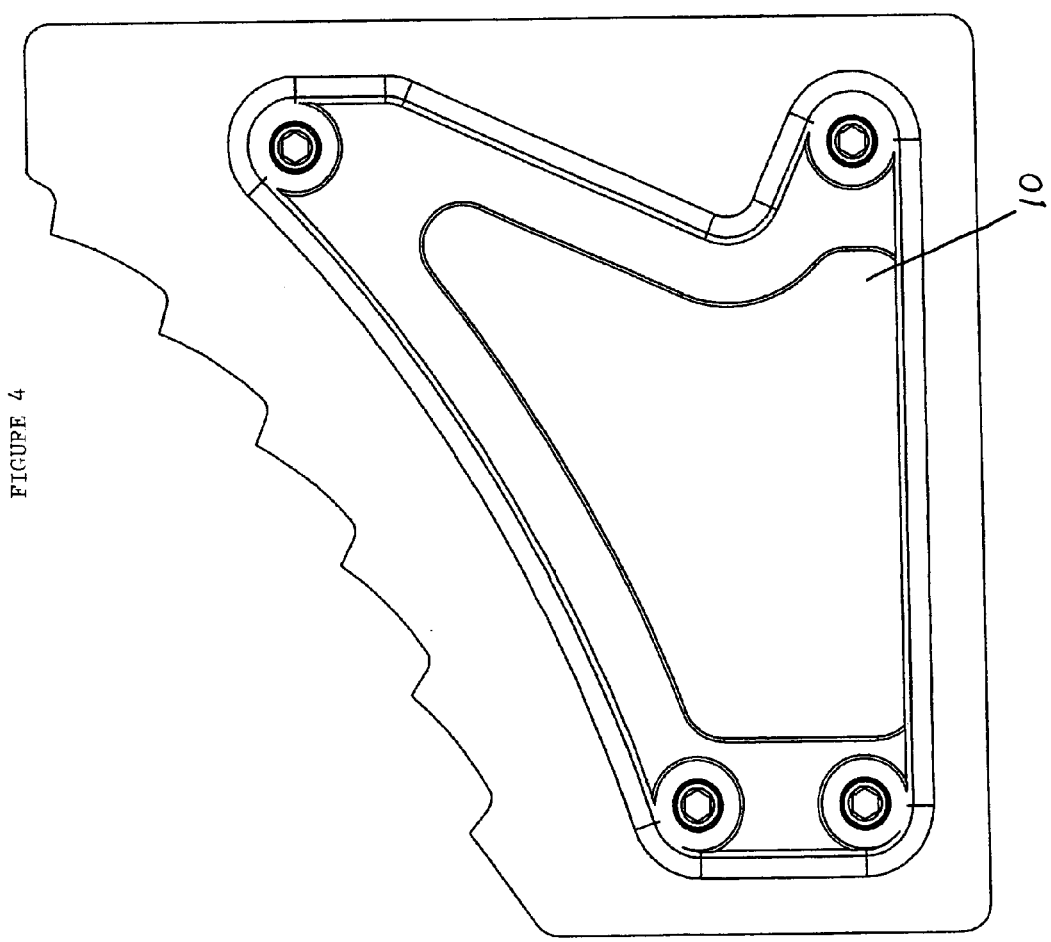
FIG. 4 depicts a side elevational view of the invention of FIG. 1.
Figure 5:
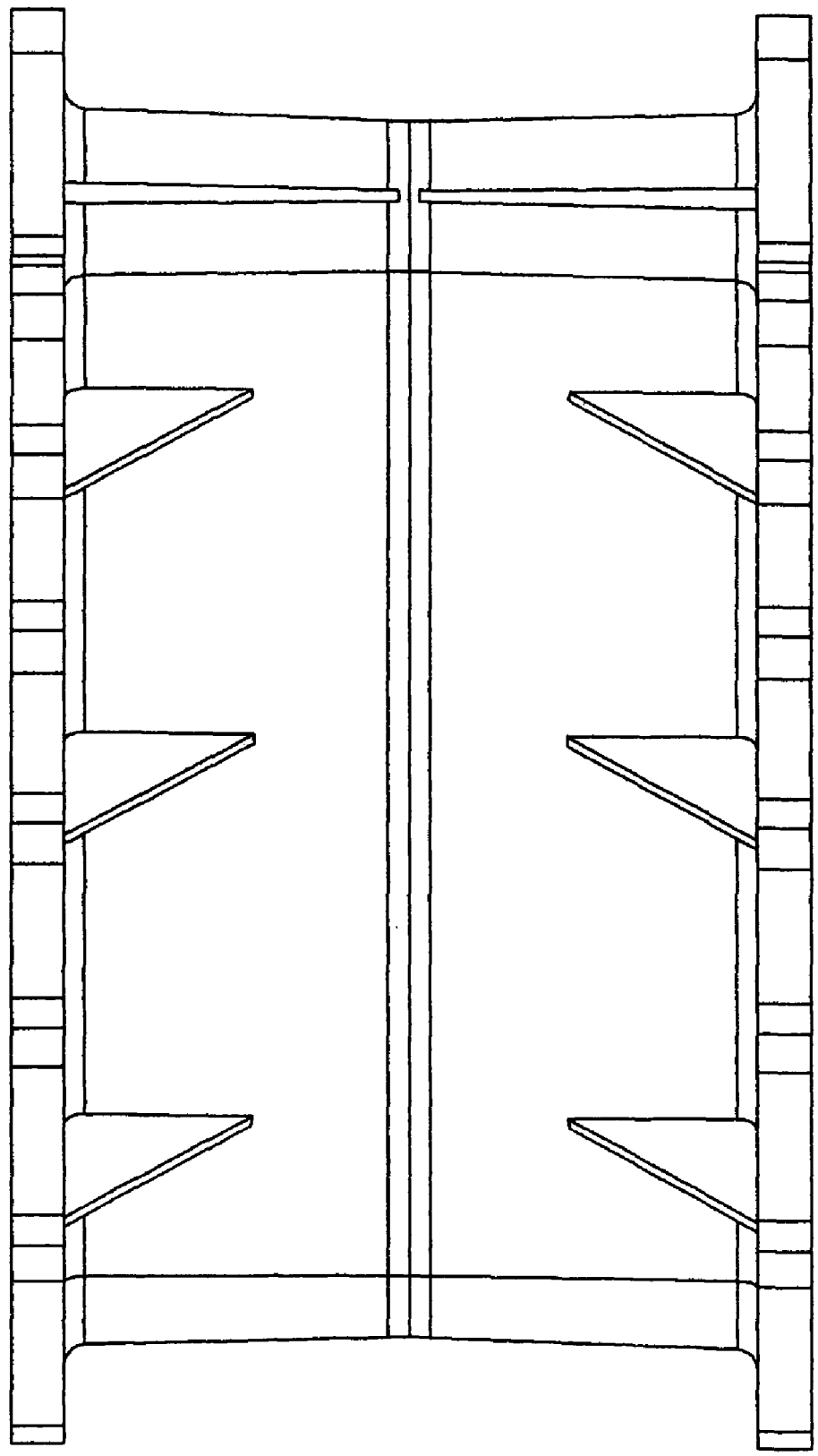
FIG. 5 depicts a top plan view of the invention of FIG. 1.
Figure 6:
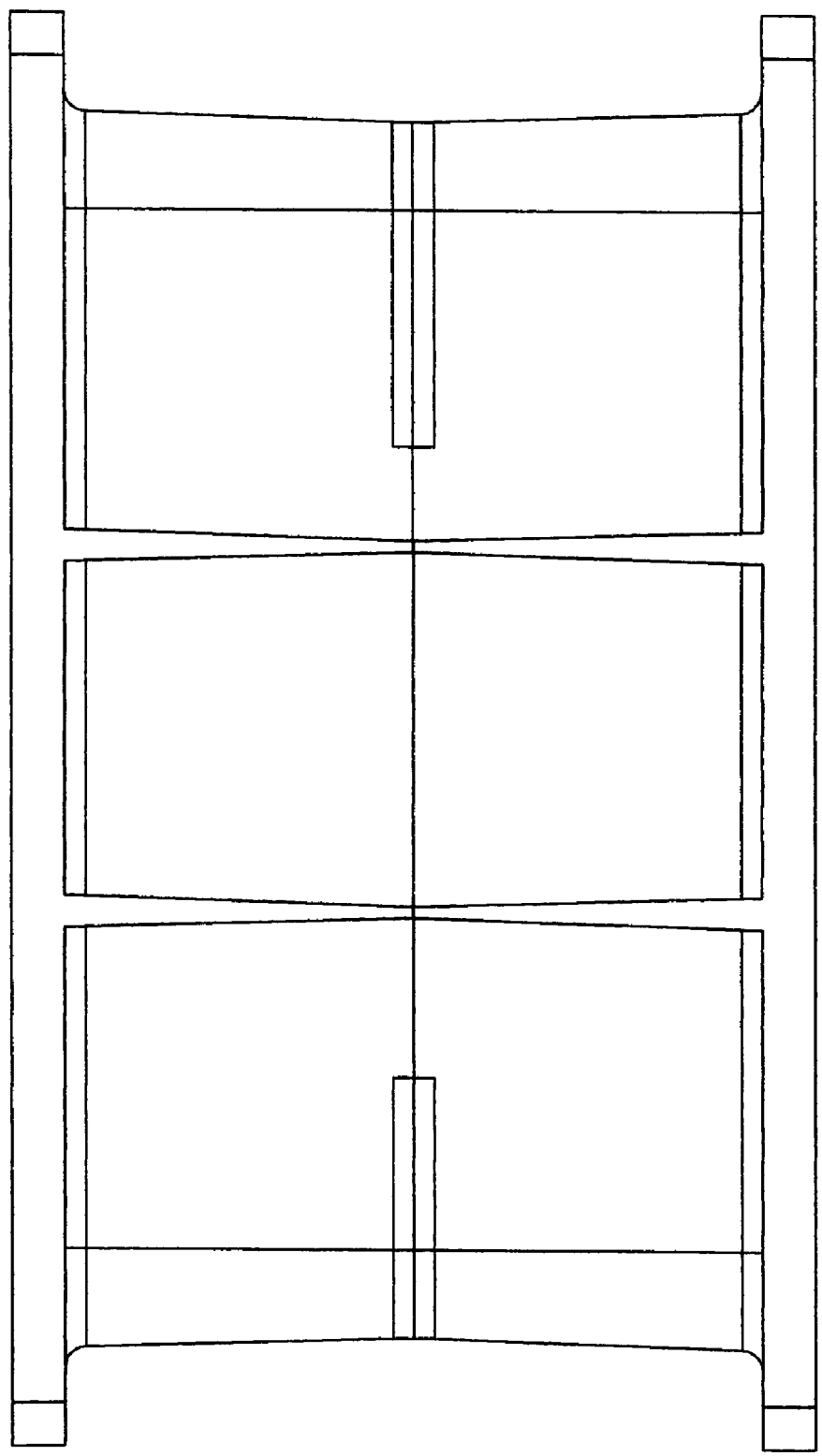
FIG. 6 depicts a bottom plan view of the invention of FIG. 1.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The word "mortise" or derivative thereof essentially means a usually rectangular or square cavity or depression in a surface, sized to accept insertion of a tenon.

The word "tenon" or derivative thereof essentially means a projection or protuberance sized for snug insertion into a mortise.

The word "concave" or derivative thereof essentially means having an arc comparable (and complimentary) to that of the road engaging surface of a tire for which the device is intended to be used.

The word "tread" or derivative thereof essentially means the essentially horizontal road engaging surface of a tire for which the device is intended to be used; not limited to the grooves of that surface.

The word "scalloping" or derivative thereof essentially means curved cutouts resembling a series of waves having a valley between two crests.

The word "sawteeth" or derivative thereof essentially means a plurality of teeth in linear or staggered array or arrangement; each tooth in the sawteeth may have the same height, sharpness and proximity relative to an adjacent tooth, or such characteristic(s) may be varied between adjacent teeth so long as no variation undermines the ability to prevent rotation of the wheel around its axle.

The phrase "structurally connecting" or derivative thereof essentially means to connect sufficiently rigidly and permanently to enable the connected elements to accomplish their intended function while in use.

The word "torque" or derivative thereof essentially means to apply rotational force around an axis, such as (for example) when screwing a lug nut onto the respective bolt on a wheel hub, to hold a wheel in mounted position on the wheel hub of a vehicle.

Also for the sake of simplicity, the conjunctive "and" may also be taken to include the disjunctive "or," and vice versa, whenever necessary to give the claims of this patent application the broadest interpretation and construction possible.

Likewise, when the plural form is used, it may be taken to include the singular form, and vice versa.

The invention disclosed herein is not limited by construction materials to the extent that such materials satisfy the structural and/or functional requirements. For example, any material may be used so long as it satisfies the function for which it is being used, such as the sawteeth engaging the tire tread and preventing rotation of the suspended wheel, or the upstanding margins and transverse support means having sufficient rigidity to support the engagement between tire and the tool to prevent rotation of the suspended wheel. Such materials may include any of the following, or possibly combinations thereof: steel, aluminum, titanium, other rigid metals or plastic or other polymeric materials, and combinations or composites thereof.

Although the invention has a number of features and variations, its most general form includes (comprises) a device for allowing lateral movement of a suspended vehicle wheel while preventing rotation of the suspended vehicle wheel, comprising a plurality of parallel upstanding margins (11) or vertical wall-like structures, each comprising an uppermost edge (12) ascending concavely and defining a tire engaging interface, each of said uppermost edges further comprising scalloping (13), or cutout portions, defining a plurality of sawteeth (14). Each of the sawteeth has an apex (15) comprising the initial tire engaging interface of the uppermost edge; absent the scalloping, the uppermost edge would ascend in uniform (unbroken) fashion concavely, with a curvature approximating that of the tire tread for which the tool is intended to be used. The tool preferably includes a pair of upstanding margins, in mirror image arrangement, although additional upstanding margins may be situated therebetween as well. Moreover, the respective sawteeth arrangements may compliment each other, in mirror image or otherwise.

In a more particular version of the tool, each of said upstanding margins includes a leading tip (16) extending essentially vertically from a basal edge (17) to commencement of said ascending uppermost edge; when the tool is positioned on the ground with the sawteeth ascending diagonally and concavely, the leading tip is a relatively short distance from the basal edge stabilizing the tool on the ground or atop other surface substratum. When the tool is in use adjacent the tire tread and crown of a suspended wheel, with the concave rows of sawteeth contacting the tire, the leading tip is relatively nearer the portion of the tire that would contact the ground. Each of the upstanding margins further includes a trailing end (18) extending essentially vertically from the opposite end of the basal edge to conclusion of the ascending uppermost edge of the row of sawteeth.

A more particular version of the tool includes means for providing transverse support between said upstanding margins. Said transverse support means may include at least one crosspiece structurally connecting said upstanding margins. Each crosspiece may include transverse supporting wall(s) (101, FIG. 1) extending perpendicularly from the inner surface of the upstanding margin and toward abutment with an adjacent upstanding margin (or complimentary transverse support wall thereof). Alternatively or additionally, the transverse support means may include crossbar(s) (201, FIG. 9) that may be tubular, including screws at each end (or a bolt, with nut, running therethrough) and connecting upstanding margins at each end. In a molded version of the invention, such as (for example) molded plastic or polymeric material(s), there may be included a concave ramp (102, FIG. 1) offset below said scalloping and structurally connecting said upstanding margins.

Figure 9:
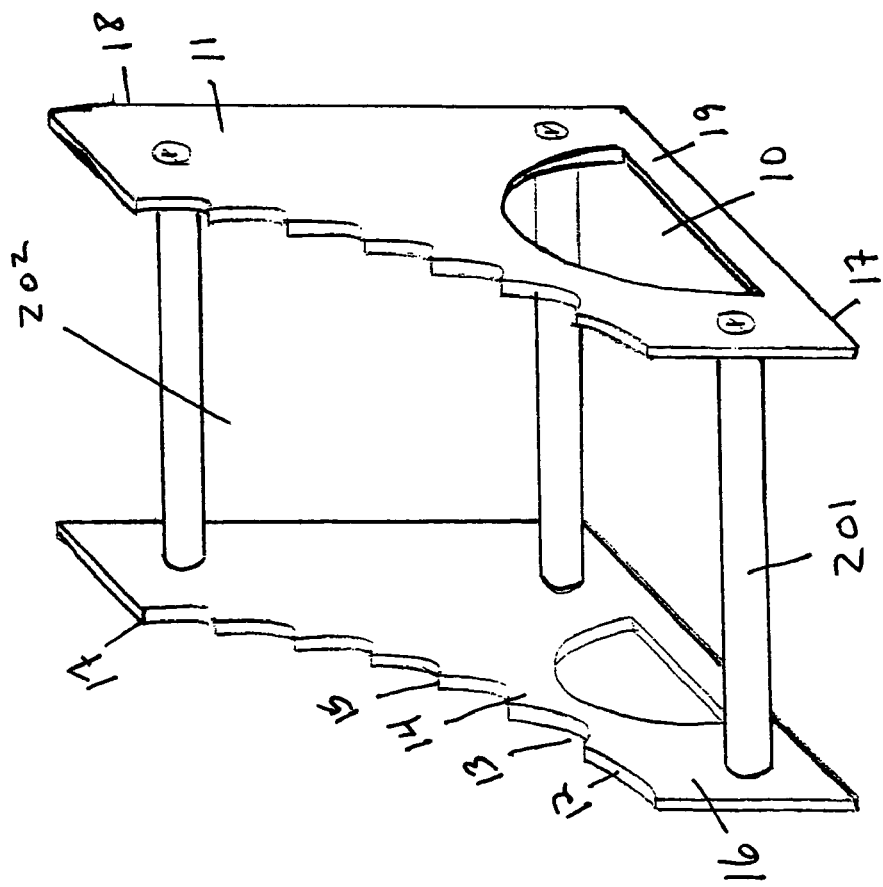
FIG. 9 depicts a perspective view of one version of the invention including crossbars for transverse support.
Figure 12:
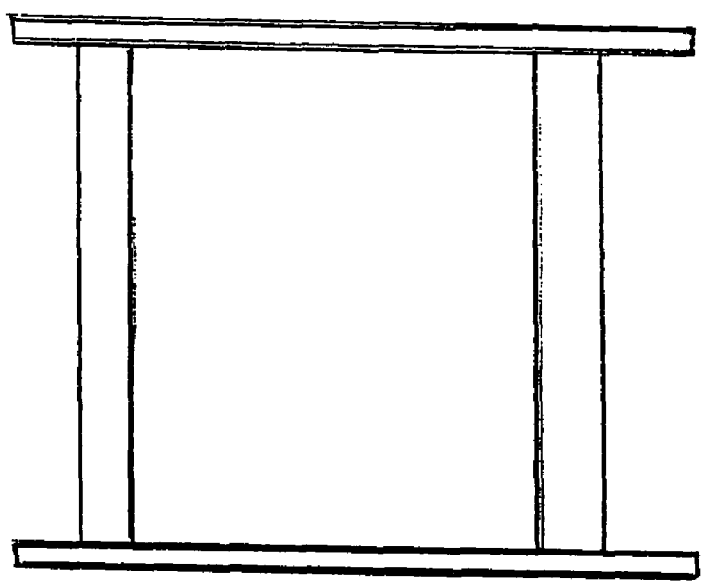
FIG. 12 depicts a back elevational view of the invention of FIG. 9.
Figure 11:
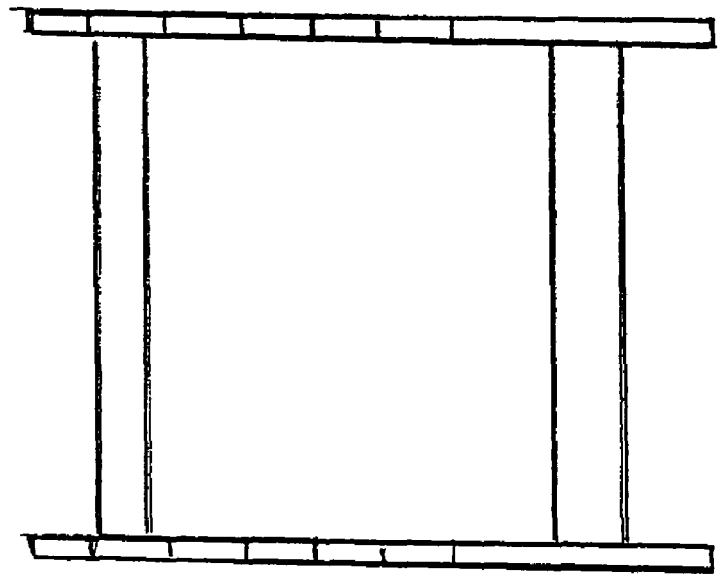
FIG. 11 depicts a front elevational view of the invention of FIG. 9.
Figure 14:
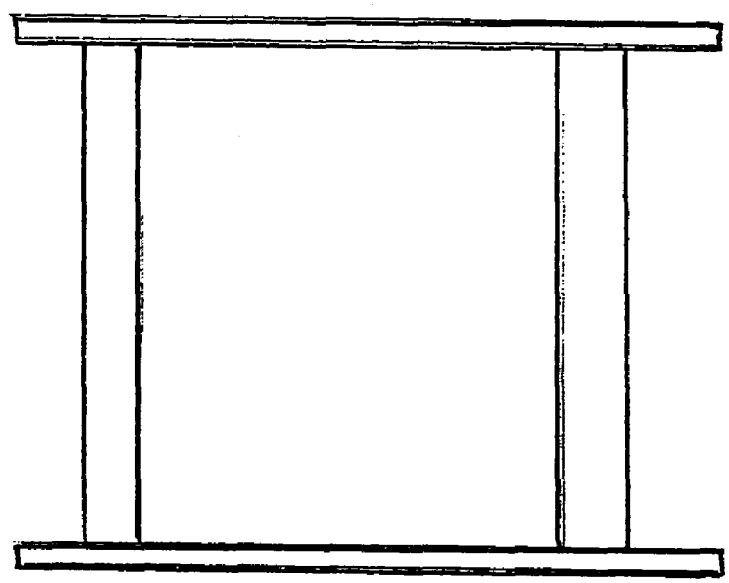
FIG. 14 depicts a bottom plan view of the invention of FIG. 9.
Figure 13:
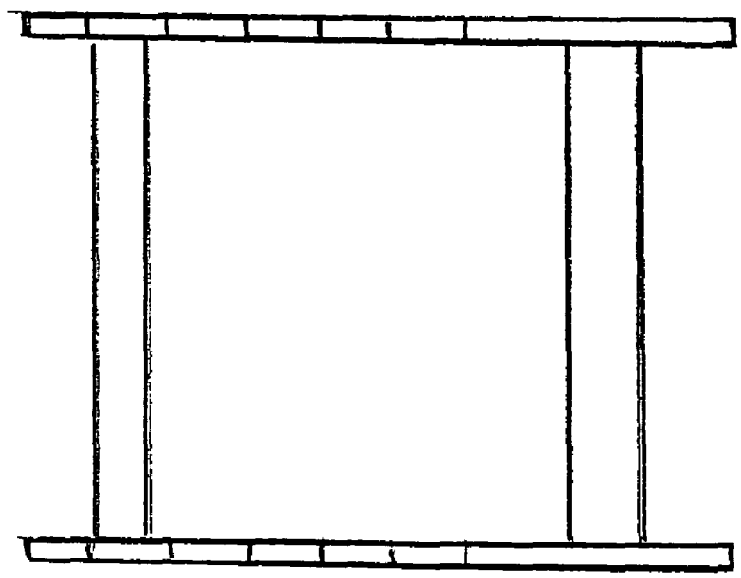
FIG. 13 depicts a top plan view of the invention of FIG. 9.
Figure 16:
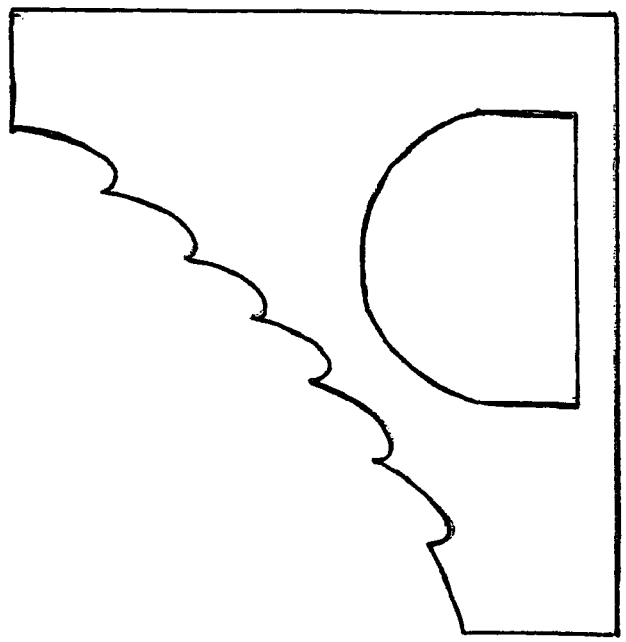
FIG. 16 depicts a side elevational view of the invention of FIG. 15.

As shown in FIG. 9, the transverse support means may include at least a first crossbar structurally connecting said leading tips of the respective upstanding margins near the respective basal edges, and at least a second crossbar structurally connecting the trailing edges of the respective upstanding margins near the respective uppermost edges. A preferable version of the invention includes at least a third crossbar structurally connecting the trailing edges of the respective upstanding margins near the respective basal edges.

Each crossbar may include means for adjusting its length. The width of the tool may be adjusted to accommodate a variety of widths of different tires, by using different lengths of tubes or by otherwise adjusting the transverse distance at which the upstanding margins are connected.

Each of the pluralities of rows of sawteeth ascending concavely may be arranged to optimize allowing lateral movement of a suspended vehicle wheel while preventing rotation of the suspended vehicle wheel. Each of said sawteeth may include an apex projecting in an orientation enabling the device to maintain contact with the wheel during lateral rocking, while opposing the rotation of the tire tread surface.

The tool may also include means for providing supporting contact with substratum. One example of such supporting contact means includes a longitudinal reinforcing region (19) above the respective basal edge, which generally abuts the ground or other surface substratum; the basal edge may even be coated with Teflon® or similar material to enhance sliding before anchoring (such as by applying foot pressure) is desired. Moreover, the basal edge may include knurling or other skid resistant features, so long as these optional features do not undermine the ability of the device to initially slide while allowing the wheel to move or rock perpendicular to its axle, but not rotate around its axle, so that the tire and wheel can fully seat against the hub assembly of the vehicle while torque is being applied to the lug nuts. For use on irregular surfaces, the basal edge (or bottom of any pedestal described herein) may include downstanding touchpoints or feet, that cause the remainder of the basal edge to be elevated off the irregular substratum to avoid such irregularities. Each of the basal edges may include at least a first touchpoint downstanding therefrom near the leading tip, and at least a second touchpoint downstanding therefrom near the trailing end.

Figure 21:
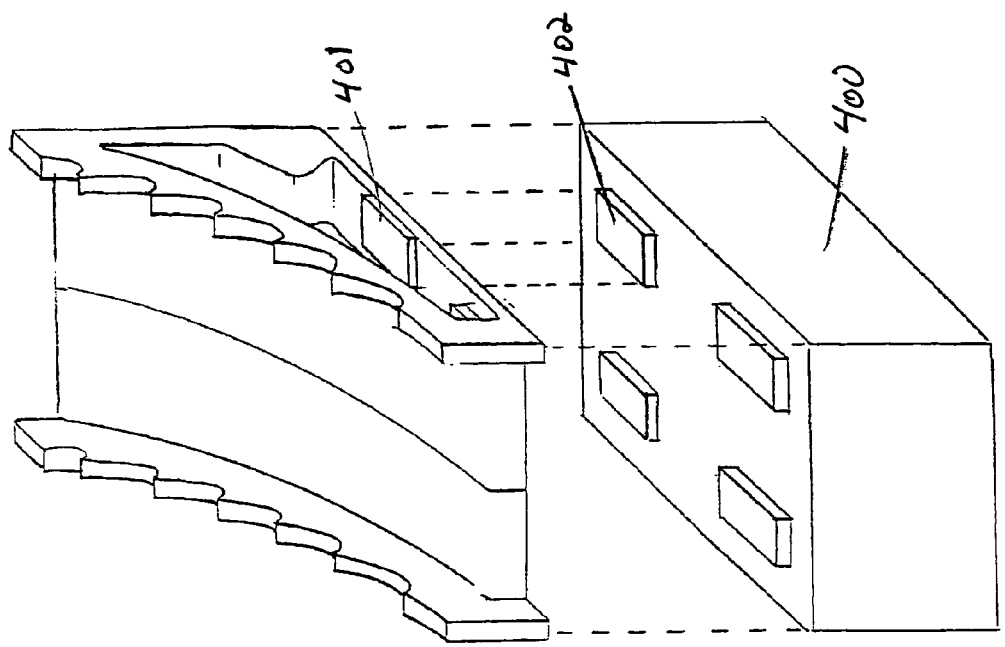
FIG. 21 depicts a perspective view from the leading tip and side of one version of the invention including a complimentary pedestal.

The longitudinal reinforcing region above the respective basal edge may further include at least one mortise (cavity) (401, FIG. 21), sized for snugly accepting a tenon (402, FIG. 21) upstanding from substratum such as (for example) a separate elevation support pedestal (400). Alternatively, the basal edge may further include at least one downstanding tenon sized for snug insertion into a mortise opening from substratum such as the top of the pedestal. In this version, the tenon downstanding from the basal edge may serve as a touchpoint in the absence of a mortise.

Figure 7:
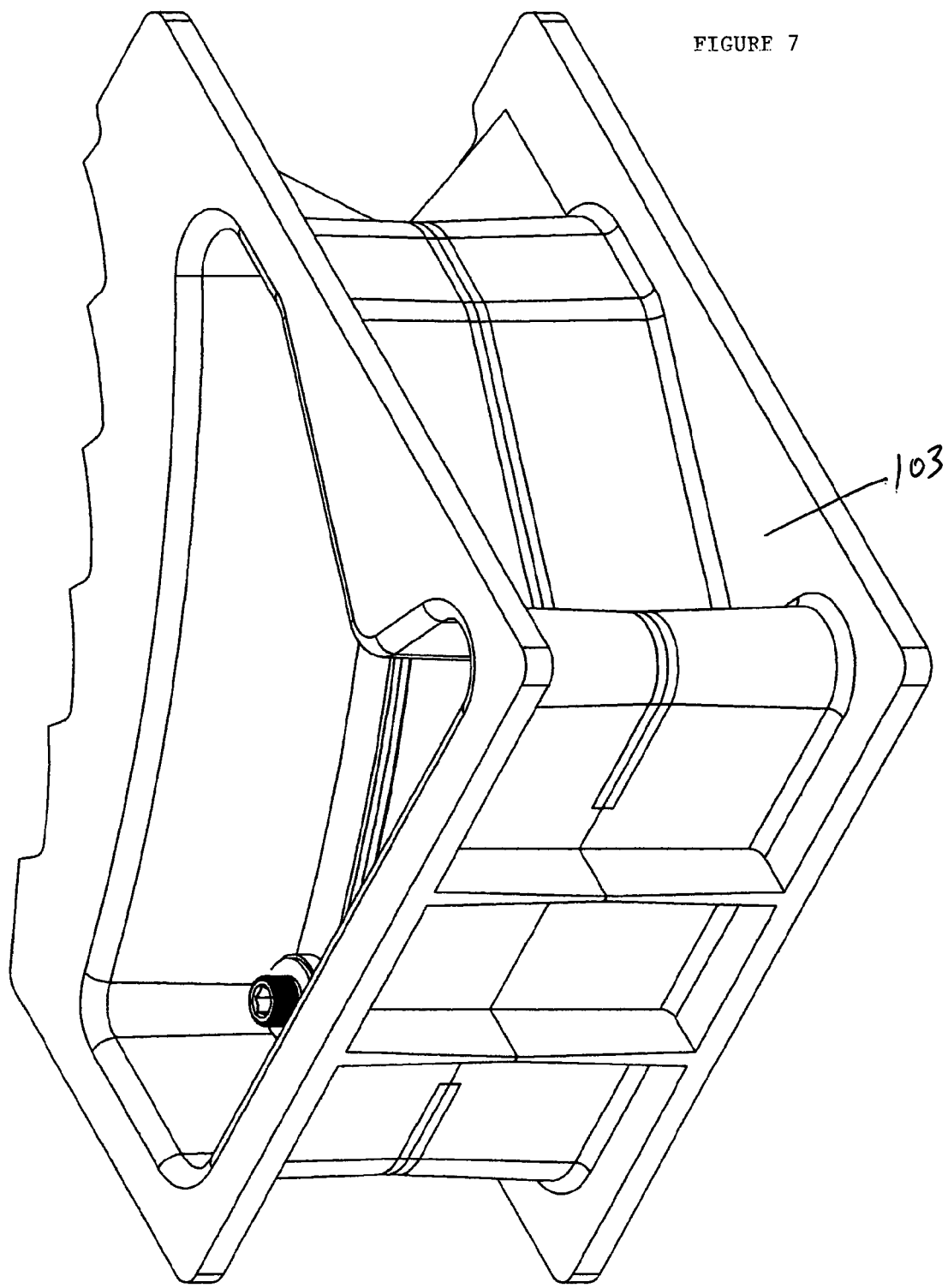
FIG. 7 depicts a perspective view from the trailing end and bottom of the invention of FIG. 1.

Another version of the tool includes a portal sufficiently sized to allow insertion of the user's forefoot, to facilitate placement beneath the suspended vehicle tire. This feature can make use easier, and reduce the amount of time spend bending down to place the tool in the desired position beneath the wheel, or to properly move and position the device in engaging contact with the tire during the tire torquing process. Another version of the invention includes a portal sufficiently sized to allow insertion of the user's forefoot to anchor said device to firmly prevent rotation of the suspended vehicle tire when in use. This portal may be the same as before, or in a different location. One portal can be located between said respective trailing ends and said second and third crossbar (202, FIG. 9). In one version made of molded plastic or other polymeric or composite material, the essentially vertical face transversely spanning between the trailing ends may include an angular recess (103, FIG. 7) sized to accept the user's forefoot. Another portal may made in the longitudinal reinforcing region of the upstanding margin: the margin may be cut out to define a portal (10) sufficiently sized to allow insertion of the user's forefoot.

Figure 15:
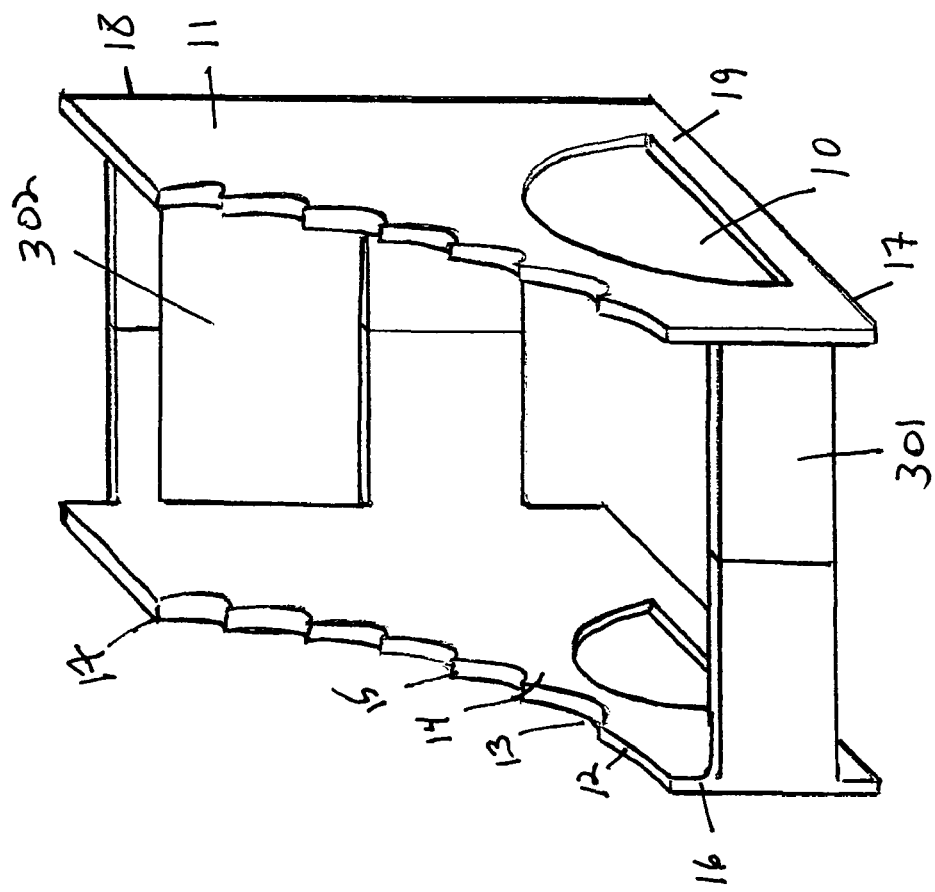
FIG. 15 depicts a perspective view of one version of the invention including leading and trailing crossplates for transverse support.
Figure 18:
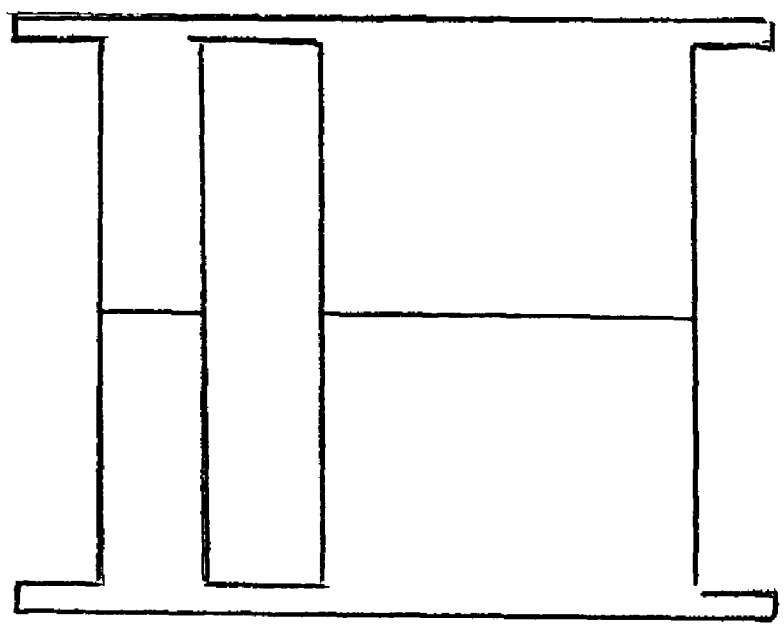
FIG. 18 depicts a back elevational view of the invention of FIG. 15.
Figure 17:
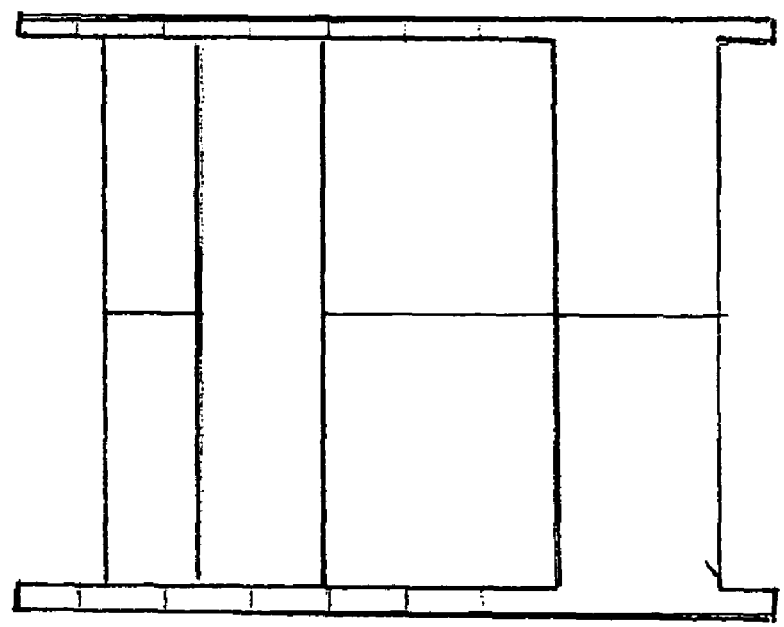
FIG. 17 depicts a front elevational view of the invention of FIG. 15.
Figure 20:
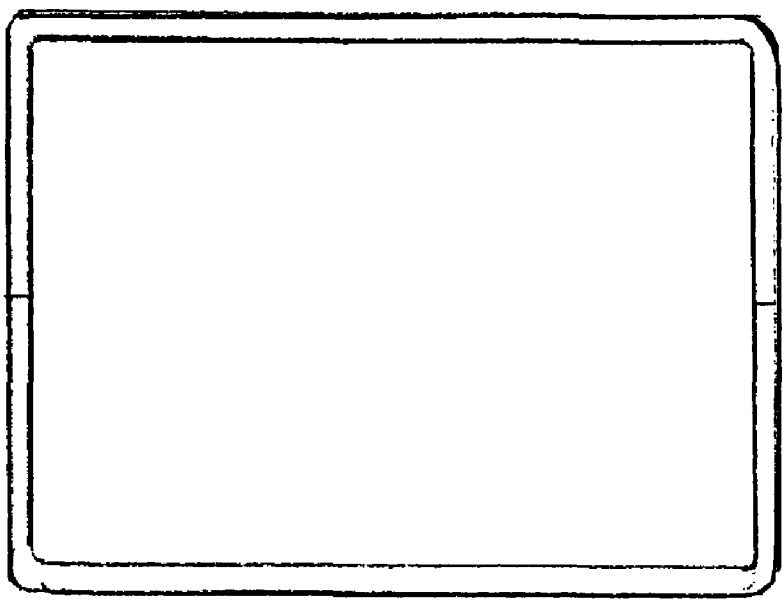
FIG. 20 depicts a bottom plan view of the invention of FIG. 15.
Figure 19:
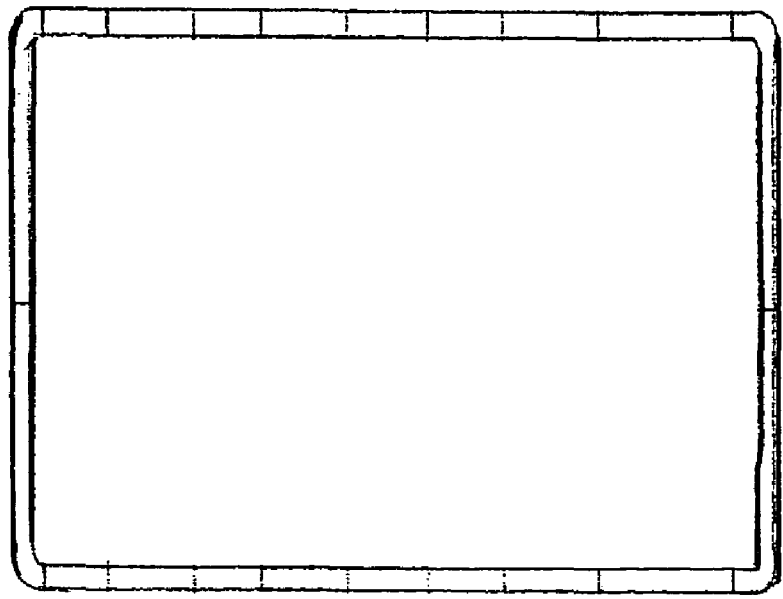
FIG. 19 depicts a top plan view of the invention of FIG. 15.
Figure 22:
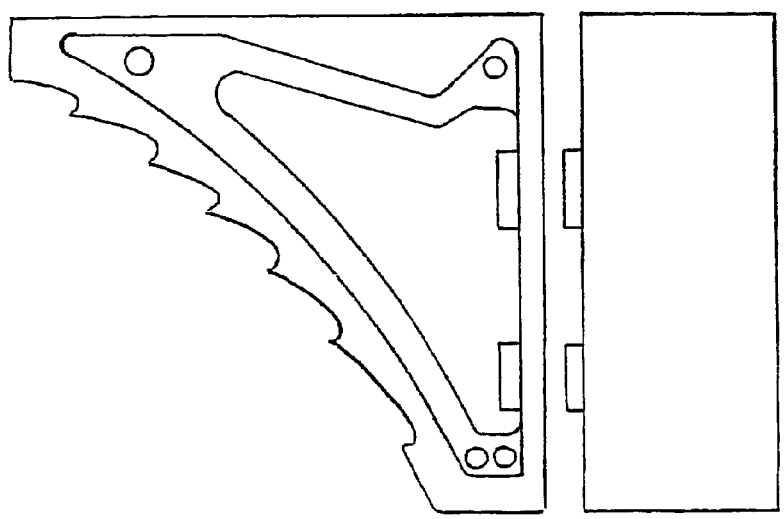
FIG. 22 depicts a side elevational view of the invention of FIG. 21.

The transverse support means for one particular version may include (comprise) at least one crosspiate (301, FIG. 15) at the leading tip, and at least one cross plate at the trailing edge. Moreover, there may be a portal (302, FIG. 15) between one crossplate at the trailing edge and a second crossplate at the trailing edge, sufficiently sized to accept insertion of a foot for positioning of the device or for any anchoring that may be desired.

Figure 8:
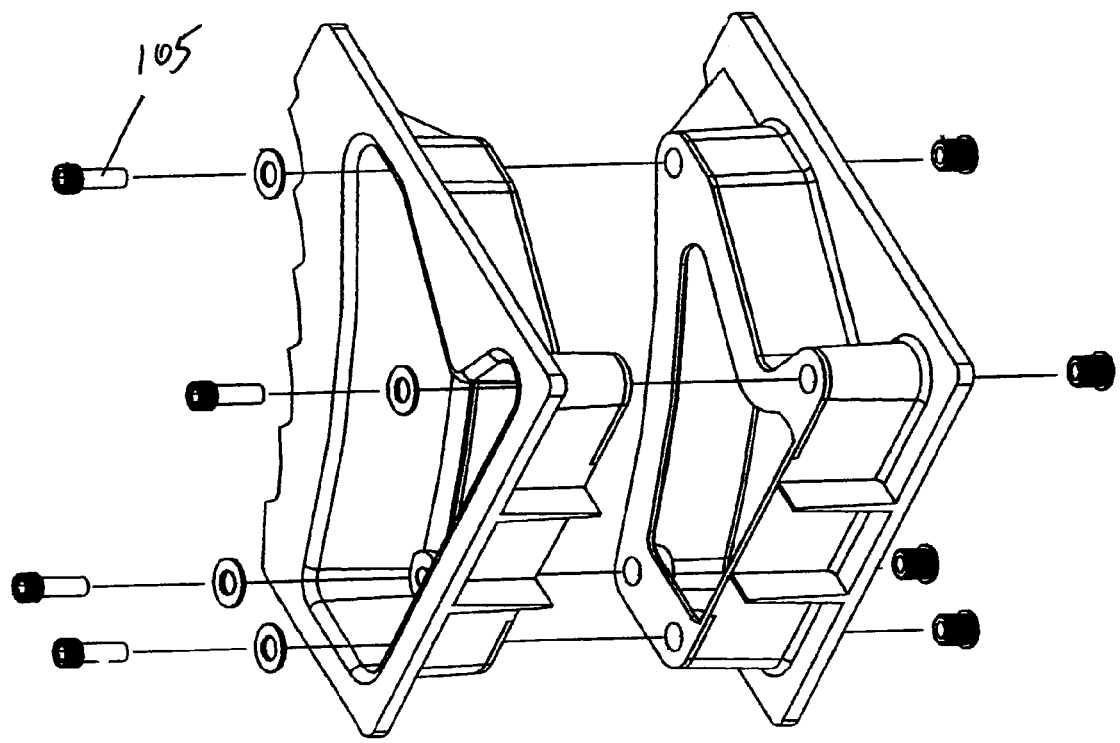
FIG. 8 is an exploded view of the invention as depicted in FIG. 7.
Figure 10:
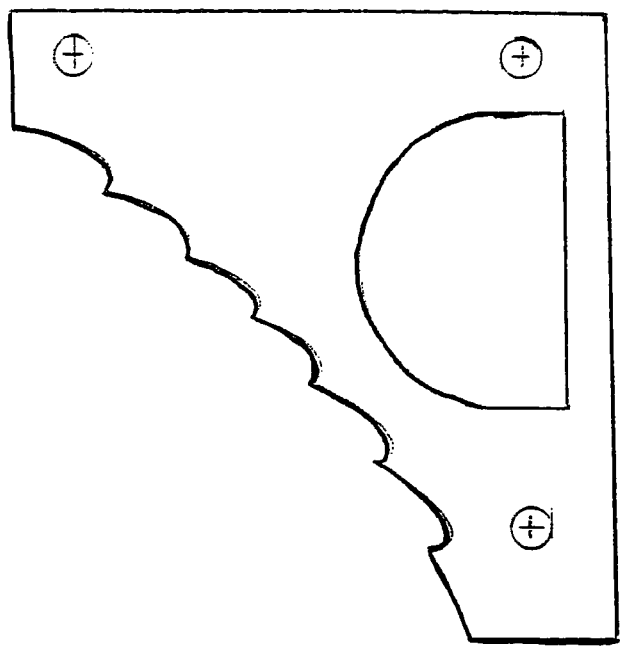
FIG. 10 depicts a side elevational view of the invention of FIG. 9.

The invention may be constructed of two halves joined together. Ideally each half would include a complete complement comprising an upstanding margin, sawteeth arranged in concave ascending order, a leading tip and trailing end with intermediate basal edge, and a portion of transverse support means complimenting or cooperating with the portion of transverse support means of the other half. For example, the version depicted in FIGS. 7 and 8 may include two halves of molded plastic or other supportive polymeric material, in which the halves are connected (and transverse support is provided by) crossbolts (105, FIG. 8). The version depicted in FIG. 15 may include two halves of steel plating or other supportive material, in which the halves are connected (and transverse support is provided by) a leading crossplate and a trailing crossplate that span from both respective upstanding margins and meet in the intermediate transverse region at, for example, a welding point or line.

One specific version of the invention includes a device for allowing lateral movement of a suspended vehicle wheel while preventing rotation of the suspended vehicle wheel, comprising:

(a) a plurality of parallel upstanding margins each comprising an uppermost edge ascending concavely from a leading tip to a trailing end and defining a tread engaging interface, said leading tip extending vertically from a basal edge to commencement of said ascending uppermost edge, said trailing end extending vertically from said basal edge to conclusion of said ascending uppermost edge, each of said uppermost edges further comprising scalloping defining a plurality of sawteeth each having an apex comprising said tire engaging interface;

(b) each further comprising means for transversely supporting said upstanding margins, comprising a transverse support wall gusseted and extending perpendicularly to said upstanding margin and beneath said uppermost edge, said transverse wall further extending from near said uppermost edge near said trailing end vertically downward near said trailing end and terminating near said basal edge near said trailing end but having an intermediate curvature defining an appendage support notch in said trailing end;

(c) further comprising means for transversely connecting said upstanding margins, comprising at least a first crossbolt extending through said transverse support walls at said leading tips of said respective upstanding margins near said respective basal edges, at least a second crossbolt extending through said transverse support walls at said respective leading tips near said respective uppermost edges, at least a third crossbolt extending through said transverse support walls at said trailing ends near said respective basal edges, and at least a fourth crossbolt extending through said transverse support walls at said trailing ends near said respective uppermost edges; and (d) said upstanding margins comprising a cutout portal sufficiently sized to allow insertion of the user's forefoot to facilitate placement beneath the suspended vehicle tire.

An alternative embodiment includes a device for allowing lateral movement of a suspended vehicle wheel while preventing rotation of the suspended vehicle wheel, comprising:

(a) a plurality of parallel upstanding margins each comprising an uppermost edge ascending concavely from a leading tip to a trailing end and defining a tread engaging interface, said leading tip extending vertically from a basal edge to commencement of said ascending uppermost edge, said trailing end extending vertically from said basal edge to conclusion of said ascending uppermost edge, each of said uppermost edges further comprising scalloping defining a plurality of sawteeth each having an apex comprising said tire engaging interface;

(b) each further comprising means for transversely supporting said upstanding margins, comprising at least a first crosspiece structurally connecting said leading tips of said respective upstanding margins near said respective basal edges, and at least a second crosspiece structurally connecting said trailing edges of said respective upstanding margins near said respective uppermost edges, and at least a third crosspiece structurally connecting said trailing edges of said respective upstanding margins near said respective basal edges;

(c) further comprising means for transversely connecting said upstanding margins comprising, at each junction of a margin and a crossbar, a screw extending through said margin and into said the end of said crossbar.

An alternative version includes a device for allowing lateral movement of a suspended vehicle wheel while preventing rotation of the suspended vehicle wheel, comprising:

(a) a pair of parallel upstanding margins each margin of said pair comprising an uppermost edge ascending concavely from a leading tip to a trailing end and defining a tread engaging interface, said leading tip extending vertically from a basal edge to commencement of said ascending uppermost edge, said trailing end extending vertically from said basal edge to conclusion of said ascending uppermost edge, each of said uppermost edges further comprising scalloping defining a plurality of sawteeth each having an apex comprising said tire engaging interface;

(b) each margin further comprising means for transversely supporting said upstanding margins, comprising essentially half of a first crossplate structurally connecting, in conjunction with the other respective cooperating half crossplate of the other margin, said leading tips of said respective upstanding margins, and at least a second crossplate half structurally connecting, in conjunction with the other respective cooperating half crossplate of the other margin, said trailing edges of said respective upstanding margins near said respective uppermost edges, and at least a third crossplate half structurally connecting, in conjunction with the other respective cooperating half crossplate of the other margin, said trailing edges of said respective upstanding margins near said respective basal edges;

(c) further comprising means for transversely connecting said respective cooperating half crossplates comprising welding at each junction of said respective cooperating half crossplates.

Aside from the device disclosed herein, the invention disclosed herein includes a method of using that device, including the steps of positioning a device described in claim 1 beneath the suspended vehicle tire, and moving the device into engaging contact with the tire tread. Moving the device into engaging contact with the tire may initially occur by positioning the device so that the leading tip approaches the suspended or elevated tire (in the direction opposing tire rotation) at the essentially perpendicular angle formed by the essentially horizontal tire tread and the essentially vertical tire sidewall (crown); the movement may occur by sliding and/or slightly rocking the device, leading tip first, toward the suspended tire at said angle until engaging contact is made. The rows of teeth may be positioned so that they essentially straddle that angle, with at least one tooth of the array up one upstanding margin contacting the outer crown of the tire and with at least one tooth of the array up the other upstanding margin contacting the tire tread. The tire may thereby be slightly captured between two rows or arrays of teeth. The device may then be moved into further engaging contact with the tire, by hand or by using the forefoot inserted into one of the portals or recesses in the device described herein. This may enable to device to further capture or grip the tire. During this process, the user may also move (or slightly rock) the suspended tire laterally (sideways, back and forth), with the engaged device allowing and accommodating such slight lateral movement, to enable the wheel (movably impaled on the lug bolts) to fully seat against the vehicle hub before the lug nuts are fully tightened and optimally torqued to secure the wheel/tire to the vehicle.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

I claim:

1. A device to assist in the torquing of a suspended vehicle wheel, comprising:
   a plurality of parallel upstanding margins laterally spaced apart from each other and each comprising an uppermost edge ascending generally concavely and defining a tire engaging interface, each of said uppermost edges further comprising scalloping defining a plurality of saw teeth each having an apex comprising said tire engaging interface and;
   one or more ground engaging base portions that are coupled to and/or part of the upstanding margins, and wherein the saw teeth engage the wheel to prevent rotation of the wheel and the ground engaging base portion is configured to allow lateral movement of the wheel.

2. A device described in claim 1, each of said upstanding margins comprising a leading tip extending vertically from a basal edge to commencement of said ascending uppermost edge, each of said upstanding margins further comprising a trailing end extending vertically from said basal edge to conclusion of said ascending uppermost edge.

3. A device described in claim 2 herein, further comprising means for providing transverse support between said upstanding margins.

4. A device described in claim 3 herein, said transverse support means comprising at least one crosspiece structurally connecting said upstanding margins.

5. A device described in claim 3 herein, said transverse support means comprising at least a first crosspiece structurally connecting said leading tips of said respective upstanding margins near said respective basal edges, and at least a second crosspiece structurally connecting said trailing edges of said respective upstanding margins near said respective uppermost edges.

6. A device described in claim 3 herein, further comprising a concave ramp offset below said scalloping and structurally crossconnecting said upstanding margins.

7. A device described in claim 1 herein, each of said pluralities of sawteeth ascending concavely and arranged to optimize said allowing lateral movement of a suspended vehicle wheel while preventing rotation of the suspended vehicle wheel.

8. A device described in claim 6 herein, each of said sawteeth having said apex projecting in an orientation opposing the rotation direction of the tire tread surface.

9. A device described in claim 2 herein, further comprising means for providing supporting contact with substratum such that the device is adapted to move laterally.

10. A device described in claim 9 herein, said means for providing supporting contact with substratum comprising a longitudinal reinforcing region above said respective basal edge.

11. A device described in claim 3 herein, further comprising a portal sufficiently sized to allow insertion of the user's forefoot to facilitate placement beneath the suspended vehicle tire.

12. A device described in claim 3 herein, further comprising a portal sufficiently sized to allow insertion of the user's forefoot to anchor said device to firmly prevent rotation of the suspended vehicle tire when in use.

13. A device for assisting in the torquing a suspended vehicle wheel, comprising:
   (a) a plurality of spaced apart parallel upstanding margins each comprising an uppermost edge ascending concavely from a leading tip to a trailing end and defining a tread engaging interface, said leading tip extending vertically from a basal edge to commencement of said ascending uppermost edge, said trailing end extending vertically from said basal edge to conclusion of said ascending uppermost edge, each of said uppermost edges further comprising scalloping defining a plurality of sawteeth each having an apex comprising said tire engaging interface, wherein when engaged, the plurality of parallel upstanding margins prevent rotation of the wheel but allow lateral movement of the wheel;
   (b) each further comprising means for transversely supporting said upstanding margins, comprising a transverse support wall gusseted and extending perpendicularly to said upstanding margin and beneath said uppermost edge, said transverse wall further extending from near said uppermost edge near said trailing end vertically downward near said trailing end and terminating near said basal edge near said trailing end but having an intermediate curvature defining an appendage support notch in said trailing end;
   (c) further comprising means for transversely connecting said upstanding margins, comprising at least a first crossbolt extending through said transverse support walls at said leading tips of said respective upstanding margins near said respective basal edges, at least a second crossbolt extending through said transverse support walls at said respective leading tips near said respective uppermost edges, at least a third crossbolt extending through said transverse support walls at said trailing ends near said respective basal edges, and at least a fourth crossbolt extending through said transverse support walls at said trailing ends near said respective uppermost edges; and (d) said upstanding margins comprising a cutout portal sufficiently sized to allow insertion of the user's forefoot to facilitate placement beneath the suspended vehicle tire.

14. A method of torquing lug nuts of a suspended vehicle wheel facilitating the seating of a vehicle wheel against the vehicle hub, comprising the steps of moving a device of claim 1 into engaging contact with the underside of the tire tread, and tightening lug nuts around the wheel while allowing said device freedom to allow the lateral motion of the wheel during the process of seating the wheel against the vehicle hub.

15. A device to assist in the torqueing of suspended tire, comprising:
   a tire engaging interface disposed on substantially parallel upstanding margins, the tire engaging interface adapted to resist only rotational movement of the suspended tire during a torqueing operation;
   a basal dege adapted for lateral movement on an underlying substratum, and configured to support the upstanding margins; and
   wherein the basal edge is coated with a material to enhance sliding.

16. The device of claim 1, wherein the ground engaging base is defined by bottom edges of the plurality of parallel upstanding margins.

* * * * *